(12) United States Patent
Park

(10) Patent No.: US 6,687,438 B2
(45) Date of Patent: Feb. 3, 2004

(54) LOOSE TUBE RIBBON OPTICAL CABLE

(75) Inventor: Kyung-Tae Park, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/101,253

(22) Filed: Mar. 19, 2002

(65) Prior Publication Data

US 2003/0044142 A1 Mar. 6, 2003

(30) Foreign Application Priority Data

Aug. 28, 2001 (KR) ......................... 2001-51943

(51) Int. Cl.⁷ ................................. G02B 6/44
(52) U.S. Cl. ................... 385/114; 385/109; 174/72 TR
(58) Field of Search ................. 385/109–114; 174/72 TR, 117 F, 117 R

(56) References Cited

U.S. PATENT DOCUMENTS

| 4,972,041 | A | * | 11/1990 | Crawley et al. ........... 174/36 |
| 5,481,069 | A | * | 1/1996 | Andresen et al. ......... 174/117 F |
| 5,665,940 | A | * | 9/1997 | Chimura et al. ............ 174/116 |
| 6,392,155 | B1 | * | 5/2002 | Shimizu et al. .......... 174/117 F |
| 2002/0159727 | A1 | * | 10/2002 | Okada et al. ................ 385/109 |
| 2003/0016925 | A1 | * | 1/2003 | Sun et al. .................... 385/115 |
| 2003/0068147 | A1 | * | 4/2003 | Nechitailo .................... 385/114 |

FOREIGN PATENT DOCUMENTS

| JP | 63237008 | * | 10/1988 |
| JP | 1150106 | * | 6/1989 |

* cited by examiner

*Primary Examiner*—Michael C. Zarroli
(74) *Attorney, Agent, or Firm*—Cha & Reiter, LLC

(57) ABSTRACT

A loose tube ribbon optical cable is disclosed and includes at least one reinforced ribbon optical fiber bundle that includes a multifiber cable arrayed in parallel, a ribbon optical fiber bundle formed of multi-layered ribbon optical fibers for coating the multifiber cable, and a pair of reinforcing layers with both edges bent towards the periphery of the ribbon optical fiber bundle, the pair of reinforcing layers being formed on the outside of the bundle. The loose tube is packed with the reinforced ribbon optical fiber bundle, and an outer coating disposed in a peripheral of the ribbon optical cable, enclosing the loose tube(s).

20 Claims, 6 Drawing Sheets

LOOSE TUBE RIBBON OPTICAL CABLE

CLAIM OF PRIORITY

This application claims priority to an application entitled "A Ribbon Optical Cable with a Loose Tube" filed in the Korean Industrial Property Office on Aug. 28, 2001 and assigned Serial No. 2001-51943, the contents of which are hereby incorporated by reference.

BACKGROUND OF THE INVENTION

1. Field of the Invention

The present invention relates to ribbon optical cables. More particularly, the present invention relates to a ribbon optical cable with a loose tube.

2. Description of the Related Art

In the art, a ribbon optical cable is defined as an optical cable having a ribbon optical fiber as the transmission medium for an optical signal. The ribbon optical fiber is a congregated multifiber cable that is arrayed in parallel. In order to manufacture the ribbon optical fiber, the multifiber cable is first congregated in parallel, and subsequently, the optical fiber is coated with an ultraviolet curable resin. After the coating, the cable is exposed to unltraviolet to cure the resin and prepare the ribbon optical fiber.

In addition, the ribbon optical fiber can be manufactured with a matrix structure by laying a plurality of the ribbon optical fibers described above. Since the multifiber cable is congregated to make the ribbon optical fiber, the density of the optical fiber in a limited space is relatively very high. Considering that the most conduct lines available today are already paved with a number of optical cables, and that a new paving space in the conduct line is seriously deficient, the high-density ribbon optical cable, if it can be implemented, will be one of the best options people have right now. In fact, there have been some attempts to diminish the outer diameter of the optical cable in order to pave more optical fibers in that narrow conduct line, increasing the packing density of the optical fibers.

FIG. 1 is a front cross sectional view showing a loose tube paved with a ribbon optical fiber bundle in the prior art, and FIG. 2 is a side cross sectional view showing the loose tube as taken along line A–A' of FIG. 1. With reference to FIG. 1, the loose tube ribbon optical cable includes: a plurality of optical fibers 120 that coat multifiber cables 110 arrayed in parallel, ribbon optical fiber bundle 130 that are prepared by layering the plural ribbon optical fibers one at a time in order, a loose tube 150 that is paved with the ribbon optical fiber bundle 130, and a jelly 140 that packs the empty space inside of the loose tube 150.

As shown FIG. 2, the ribbon optical fiber bundle 130 is smoothly bent, so as not be arranged in a straight line, along the longitudinal direction of the loose tube 150. The reason that the ribbon optical bundle 130 is bent is because the bundle grows longer than the loose tube 150. In addition, for the purpose of improving a lay ratio, the ribbon optical fiber bundle 130 in the loose tube 150 can be arranged in spiral lengths as well.

Again referring to FIGS. 1 and 2, the four edges (C, D, E and F) of the ribbon optical fiber bundle 130 are adhered closely to the inner wall of the loose tube 150, so the edges (C, D, E and F) of the ribbon optical fiber bundle 130 are subjected to a compressive force. This compressive force, on the other hand, is proportional to the lay ratio of the ribbon optical fiber bundle 130, while inversely proportional to a clearance inside of the loose tube 150. Unfortunately, such compressive force can cause microbending on the surface of the optical fiber comprising the ribbon optical fiber bundle 130, or even can be caused by flaws on the surface optical fiber. Further, the microbending is a main factor in decreasing optical signals forwarding to the optical fiber 110.

Although the microbending problem might be overcome by extending the diameter of the loose tube 150, this approach has been considered unworkable because the diameter of the ribbon optical fiber bundle for paving the loose tube 150 with the extended diameter becomes consequently enlarged as well.

SUMMARY OF THE INVENTION

It is, therefore, an object of the present invention to provide a loose tube ribbon optical cable with a smallest diameter to prevent the microbending of edges of a ribbon optical fiber bundle.

To achieve the above object, there is provided a loose tube ribbon optical cable, which includes at least one reinforced ribbon optical fiber bundle that includes a multifiber cable arrayed in parallel, a ribbon optical fiber bundle formed of multi-layered ribbon optical fibers for coating the multifiber cable, and a pair of reinforcing layers with both edges bent towards the outer ribbon optical fiber bundle, being formed on the outside of the bundle; at least one loose tube packed with the reinforced ribbon optical fiber bundle; and an outer coating disposed in a peripheral of the ribbon optical cable, enclosing the loose tube(s).

BRIEF DESCRIPTION OF THE DRAWINGS

The foregoing and other object and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

DETAILED DESCRIPTION OF THE PREFERRED EMBODIMENT

Figure 1:
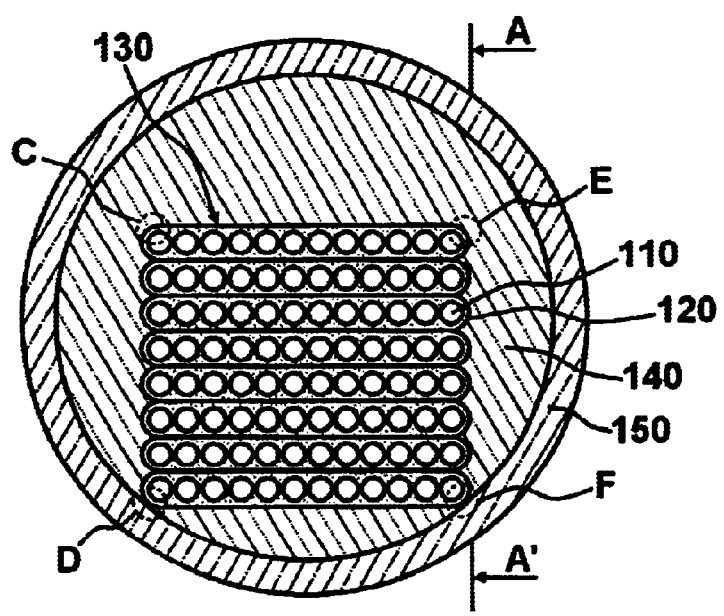
FIG. 1 is a front cross sectional view showing a loose tube paved with a ribbon optical fiber bundle in the prior art.
Figure 2:
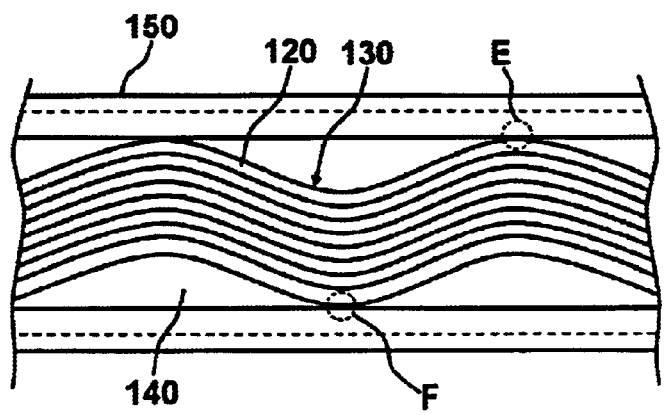
FIG. 2 is a side cross sectional view showing the loose tube as taken along line A–A' of FIG. 1.

A preferred embodiment of the present invention will now be described with reference to the accompanying drawings. In the following description, the same drawing reference numerals are used for the same elements even in different drawings. The matters defined in the description are provided for explanatory purposes to assist an artisan in a comprehensive understanding of the invention, but the invention is not limited to the examples provided. The present invention can be carried out without the matters defined in the description. Also, well-known functions or constructions are not described in detail since they would obscure the invention in unnecessary detail.

Figure 3A:
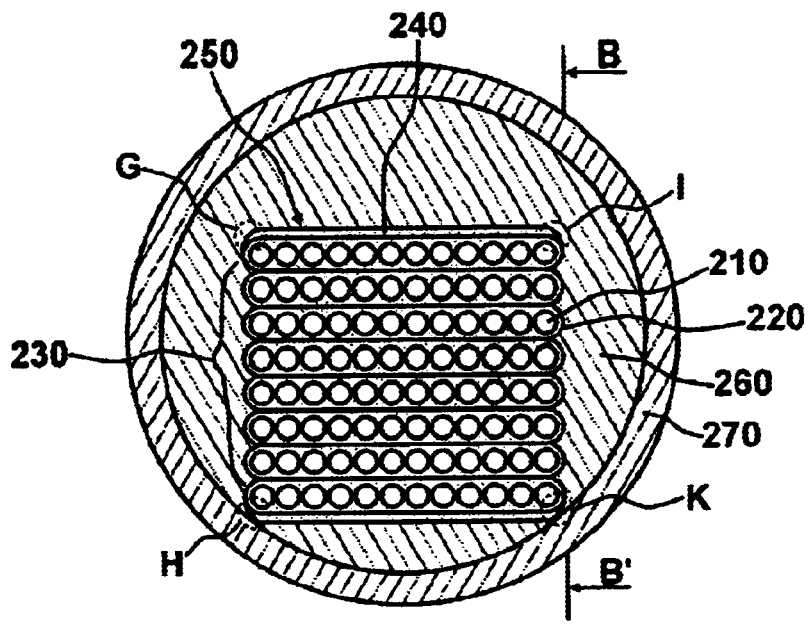
FIG. 3A is a front cross sectional view showing a stiffed ribbon optical fiber bundle in accordance with a preferred embodiment of the present invention.
Figure 3B:
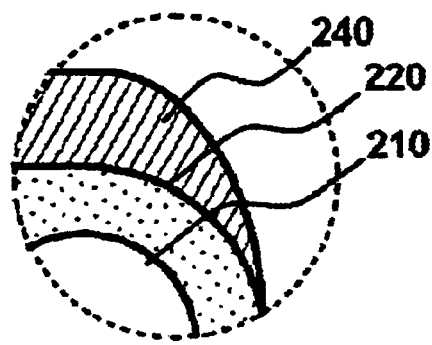
FIG. 3B is a detailed view showing the edge I (one of the dashed circles) shown in FIG. 3A.
Figure 4:
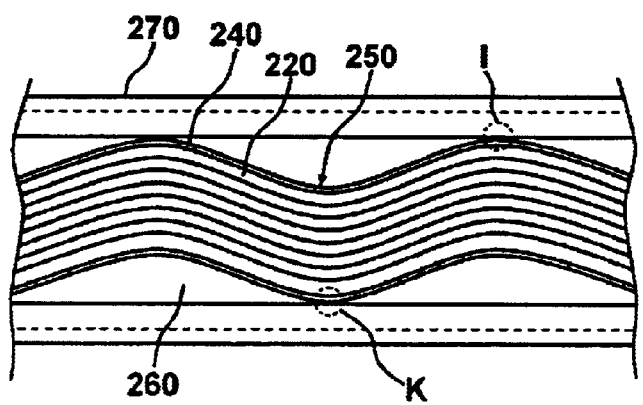
FIG. 4 is a side cross sectional view showing the loose tube as taken along line B–B' of FIG. 3.

FIG. 3 is a front cross sectional view illustrating a stiffed ribbon optical fiber bundle in accordance with a preferred embodiment of the present invention, and FIG. 4 is a side cross sectional view illustrating of the loose tube as taken along line B–B' of FIG. 3.

With reference to FIG. 3, the reinforced ribbon optical fiber bundle 250 includes a ribbon optical fiber bundle 230. As shown, the 12-fiber cables 210 is coated with a ultraviolet curable resin forming a multilayered ribbon optical fiber 220, and a pair of reinforcing layers 240 disposed at a upper portion and a lower portion of the ribbon optical fiber bundle 230. The the optical fibers 210 is coated at a liquid phase, and later cured when it is irradiated by ultraviolet light.

The reinforcing layer 240 preferably has an equivalent elastic modulus to that of the ribbon optical fiber 220 so that the reinforcing layer 240 and the ribbon optical fiber bundle 250 similarly react to any outer changes, such as temperature change or physical force. In other words, the reinforcing layer 240 can successfully prevent interfacial separation, cleavage or microbending. Moreover, the edge of the reinforcing layer 240 preferably has the equivalent curvature to that of the inner wall of the loose tube 270. In this way, the clearance of the reinforced ribbon optical fiber bundle 250 can be minimized, and the compressive force applied on the contact area between the loose tube's inner wall and the reinforced layer can be efficiently absorbed thanks to the expanded the contact area. A preferable material for the reinforcing layer 240 is selected from a group consisting of fiberglass reinforced plastic, glass steel, plastic and so forth.

The empty space inside of the loose tube 270 is packed with jelly 260, where the jelly 260 absorbs moisture permeated into the loose tube 270, and absorbs the impact or shock from the outside. In some cases, a strand-form swellable yarn (not shown) that is known to swell when absorbing moisture can be used, instead of the jelly 260.

Referring back to FIG. 3 and FIG. 4, the four edges (G, H, I and K) of the reinforced ribbon optical fiber bundle 250 receive the compressive force as they get close to the inner wall of the loose tube 270. At this time, the reinforcing layer 240 absorbs the compressive force applied, which consequently minimizes the force to be transmitted to the ribbon optical fiber bundle 230.

Figure 5:
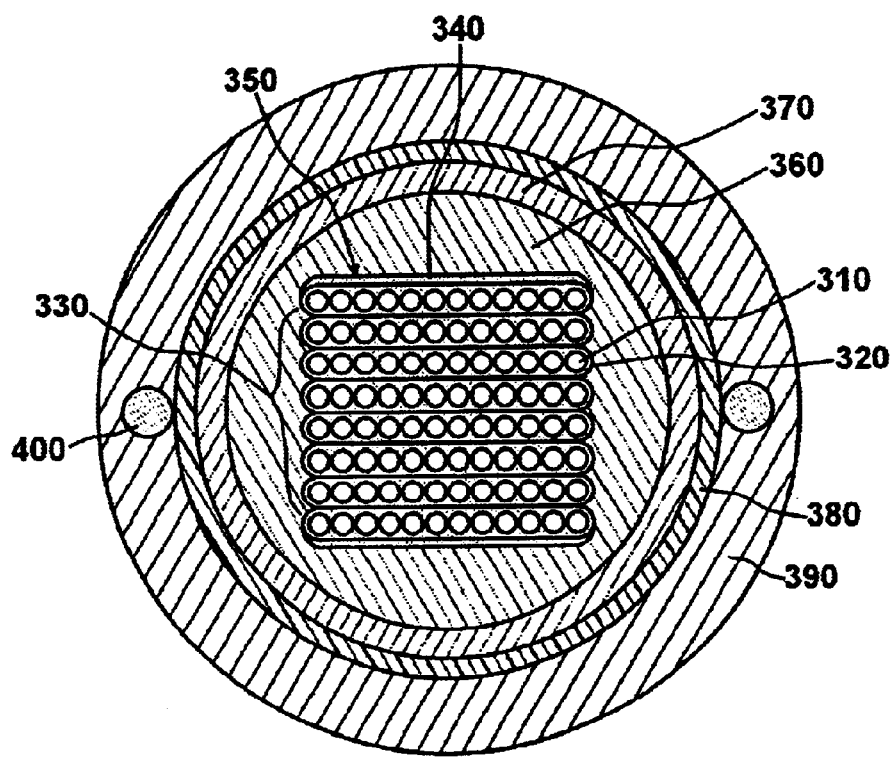
FIG. 5 is a cross sectional view showing a loose tube ribbon optical cable in accordance with a preferred embodiment of the present invention.

FIG. 5 is a cross sectional view illustrating a loose tube ribbon optical cable according to a preferred embodiment of the present invention. As shown in FIG. 5, the loose tube ribbon optical cable includes a reinforced ribbon optical fiber bundle 350, a loose tube 370 for packing the reinforced ribbon optical fiber bundle 350, a jelly for filling the empty space inside of the loose tube 370, a waterproof tape 380 for enclosing the peripheral side of the loose tube 370, an outer coating 390 disposed at a peripheral of the loose tube ribbon optical cable, and a pair of tension lines 400 inserted along the longitudinal direction of the outer coating 390.

Similar to before, the reinforced ribbon optical fiber bundle 350 includes the matrix structured ribbon optical fiber bundle 330. The 12-fiber cables 310 arrayed in parallel is coated with a ultraviolet curable resin forming a multilayered ribbon optical fiber 320, and a pair of reinforcing layers 340 disposed at a upper portion and a lower portion of the ribbon optical fiber bundle 330.

In the meantime, the jelly 360 protects the reinforced ribbon optical fiber bundle 350 from external shocks, and absorbs moisture permeated into the loose tube 370.

In addition, the waterproof tape 380 has a function of absorbing the permeated moisture into the outer coating 390. In some cases, a metallic tape can be used instead of the waterproof tape 380 for protecting the outer coating from any rodent attacks.

The pair of tension lines 400 is arrayed around the loose tube 370 to be symmetrical to each other. The tension lines provide anti-tension against the outer tension, and improve the mechanical strength of the loose tube ribbon optical cable.

Figure 6:
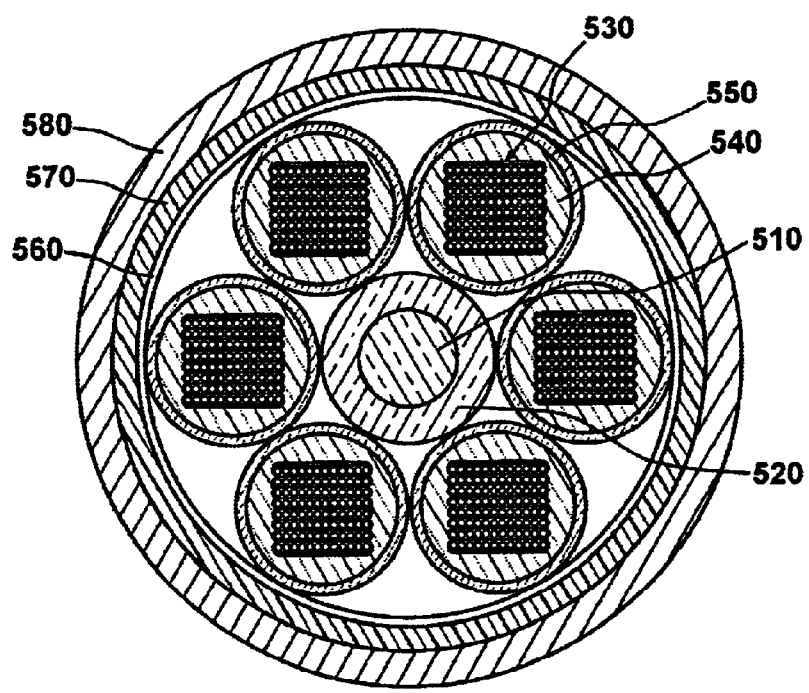
FIG. 6 is a cross sectional view showing a loose tube ribbon optical cable in accordance with an alternative preferred embodiment of the present invention.

Nest, FIG. 6 is a cross sectional view illustrating a loose tube ribbon optical cable in accordance with another preferred embodiment of the present invention. Here, the loose tube ribbon optical cable includes a central tension line 510, a plurality of loose tubes 550, a binder 560, and an auxiliary tension bar 570, and an outer coating 580.

The central tension line 510 provides for the loose tube ribbon optical cable the anti-tension, and thus it is located at the center of the cable. As for the central tension line 510, a fiberglass reinforced plastic (FRP) is typically used. And as for the material of a coating layer on the central tension line 510, a polymer, such as polyvinyl chloride (PVC) or polyethylene (PE) is often used.

The loose tube 550 packs the reinforced ribbon optical fiber bundle 530. Here, the reinforced ribbon optical bundle 530 includes the matrix structured ribbon optical fiber bundle having multilayered ribbon optical fibers that coat 12-fiber cables with ultraviolet curable resin, and a pair of reinforcing layers disposed at a upper portion and a lower portion of the ribbon optical fiber bundle. Again, the empty space inside of the loose tube 550 is packed with jelly 540 that protects the reinforced ribbon optical fiber bundle 530 from the outer shocks, and absorbs moisture permeated into the loose tube 550.

The binder 560 encompasses the plural loose tube 550, and has a function of maintaining the congregation state of the loose tubes. A preferably used material for the binder 560 is selected from a group consisting of aramid yarn, polyester yarn, polyester film and so forth.

The auxiliary tension bar 570 encloses the binder 560, and has a function of improving the anti-tension of the loose tube ribbon optical cable. Preferably, aramid yarn or glass yarn is used for the auxiliary tension bar.

The outer coating 580 is positioned at the peripheral of the loose tube ribbon optical cable. Typically used material for the outer coating is a polymer, such as PVC or PE, which is prepared by an extrusion process. In addition, the outer coating 580, for the convenience of molting, or unwrapping, can fill a rip cord adjacent to the inner wall.

In conclusion, the loose tube ribbon optical cable with the reinforced layer can successfully prevent interfacial separation that often occurs to the edges of the ribbon optical fiber bundle, cleavage or microbending in advance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A loose tube ribbon optical cable, comprising:
   at least one reinforced ribbon optical fiber bundle including: a multifiber cable arrayed in parallel, a ribbon optical fiber bundle formed of multi-layered ribbon optical fibers, and a pair of reinforcing layers with both edges bent towards a periphery of the ribbon optical fiber bundle, said pair of reinforcing layers being formed on the outside of the ribbon optical fiber bundle;
   at least one loose tube packed with the reinforced ribbon optical fiber bundle; and
   an outer coating disposed on a periphery of the ribbon optical cable, enclosing said at least one loose tube.

2. The ribbon optical cable of claim 1, wherein an empty space inside of the loose tube is packed with jelly.

3. The ribbon optical cable of claim 1, wherein an empty space inside of the loose tube is packed with yarn.

4. The ribbon optical cable of claim 1, further comprising:
   a waterproof tape, arranged on an exterior surface of the loose tube, and
   the outer coating, arranged on the waterproof tape so that the waterproof tape is disposed between said outer coating and said loose tube; and
   a pair of tension lines disposed inside of the outer coating to oppose to each other.

5. The ribbon optical cable of claim 1, further comprising:
   a binder for fixating the loose tube by enclosing a peripheral side of the loose tube; and an auxiliary tension bar interposed between the binder and the outer coating for enhancing an anti-tension.

6. The ribbon optical cable of claim 2, further comprising:
   a binder for fixating the loose tube by enclosing a peripheral side of the loose tube; and an auxiliary tension bar interposed between the binder and the outer coating for enhancing an anti-tension.

7. The ribbon optical cable according to claim 1, wherein the multi-layered ribbon optical fibers are coated with an ultraviolet light curable resin.

8. The ribbon optical cable according to claim 4, wherein the waterproof tape is metallic.

9. The ribbon optical cable according to claim 1, further comprising:
   a waterproofing substance, arranged on an exterior surface of the loose tube, and
   the outer coating, arranged on the waterproof substance so that said waterproof substance is disposed between said outer coating and said loose tube.

10. The ribbon cable according to claim 5, further comprising a central tension line arranged in a center of the ribbon cable.

11. The ribbon cable according to claim 5, wherein said at least one loose tube comprises a plurality of loose tubes, said plurality of loose tubes are arranged around the central tension line.

12. The ribbon cable according to claim 11, wherein the central tension line comprises a fiberglass reinforced plastic.

13. The ribbon cable according to claim 12, wherein an external surface of the central tension line is coated a polymer.

14. The ribbon cable according to claim 5, wherein the auxiliary tension bar comprised of one of an aramid yarn and a glass yarn.

15. The ribbon cable according to claim 6, wherein the auxiliary tension bar comprised of one of an aramid yarn and a glass yarn.

16. A method of producing a loose tube ribbon optical cable, comprising the steps of:
   (a) providing a loose tube for housing a ribbon fiber optic bundle;
   (b) arranging multifiber cables in parallel in an array to form the ribbon fiber optic bundle;
   (c) coating the multifiber cables with a curable resin;
   (d) curing the resin on the multifiber cables;
   (e) providing a pair of reinforcing layers at an upper portion and a lower portion of the ribbon fiber optic bundle, wherein said pair of reinforcing layers have both edges bent toward a periphery of the ribbon fiber optic bundle.

17. The method according to claim 16, wherein the resin in step (d) is cured by exposure to ultraviolet light.

18. The method according to claim 16, wherein a modulus of elasticity of the pair of reinforcing layers is approximately equal to a modulus of elasticity of the ribbon fiber optic bundle.

19. The method according to claim 16, wherein one of a jelly and a yarn is arranged in an empty space between the loose tube and the ribbon fiber optic bundle having reinforced layers.

20. The method according to claim 16, wherein at least one of the reinforced layers is formed so that a portion has a matching curvature of the loose tube.

* * * * *